Patented Aug. 11, 1931

1,818,165

UNITED STATES PATENT OFFICE

OTTO SCHMIDT AND JOHANNES UFER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS OF TRANSFORMING OXIDS OF CARBON INTO ORGANIC COMPOUNDS, PARTICULARLY METHANOL

No Drawing. Application filed April 29, 1924, Serial No. 709,759½, and in Germany April 30, 1923.

We have found that oxids of carbon can be readily transformed and with good yield into organic compounds, particularly methanol by passing them in mixture with hydrogen or gases containing hydrogen, at an elevated temperature and pressure over catalysts containing mixtures of two or more metals, the oxids of which are readily reducible to metal by means of hydrogen and which do not belong to the platinum group. However, iron, nickel and cobalt should not be present in the catalytic masses as the said metals are highly deleterious to the formation of methanol and other oxygenated organic compounds and would promote the formation of methane and other undesirable reactions. We direct attention to the patent of Mittasch and Pier, Serial No. 735,823, Patent No. 1,569,775, in which the exclusion of iron has been broadly claimed. As oxids of such metals we mention copper, silver, lead, cadmium and also such metals, the oxids of which can be readily reduced, for example by means of hydrogen, in the special mixture employed. Thus, for instance, zinc oxid is readily reduced in the presence of copper. The contact masses may also contain other additions, for example a small amount of potassium carbonate, also suitable supports and so on. The process can be suitably carried out at temperatures of between 200 and 350 degrees centigrade, but still higher or lower temperatures may also be used in some cases, the speed of the reaction being increased by the use of higher temperatures. The pressure may range from 100 atmospheres upwards, though lower pressures are also suitable. The greater the pressure the higher the quantity of gases undergoing reaction in a unit of time. The most suitable gas mixtures are those containing a theoretical amount of hydrogen calculated on the oxid of carbon present or an excess of hydrogen over said quantity.

The process is more fully illustrated by the following example to which however the invention is not limited.

Example

A dilute aqueous solution containing 10 molecular proportions of copper nitrate for each one molecular proportion of zinc nitrate is precipitated while hot by adding a solution of potassium carbonate. The carbonates formed are filtered off, carefully washed and dried. The powdery mass is then made into a paste with an addition of 5 per cent, by weight, of sugar and about 30 per cent, by weight, of a 30 or 40 per cent formaldehyde solution and if necessary a little water. The paste is then dried, broken into pieces and reduced with dry hydrogen at between 250 degrees and 300 degrees centigrade. Over the contact mass thus prepared, a dry mixture of about 1 volume of pure carbon monoxid with about 9 volumes of hydrogen is passed at about 300 degrees centigrade and a pressure of 150 atmospheres. The reaction gases leaving the apparatus are cooled, while maintaining the pressure, and liquid methanol separates out with good yield. The contact mass may also be brought into any desired shape or applied to a suitable support, or any other proper modification may be made. Other contact masses may be employed in a similar way, for example such as contain two or more of the metals copper, silver, lead, zinc, cadmium or others in varying percentages. Carbon monoxid may be replaced wholly or in part by carbon dioxid with also very good results, and other gases, for example nitrogen, may also be present.

The inventors in this application do not claim to have invented broadly the exclusion or iron and nickel from the catalytic reaction. That invention is shown and claimed in United States Letters Patent 1,569,775, and is the invention of the inventors named in that patent and was disclosed to the applicants in the present application before the invention of the present application was made.

What we claim is:—

1. The process of converting oxids of carbon into organic compounds, particularly methanol, which comprises passing an oxid of carbon with hydrogen at an elevated temperature and pressure over a contact mass containing about ten parts of copper to one part of zinc.

2. The process of converting oxids of carbon into organic compounds, particularly methanol, which comprises passing an oxid of carbon with hydrogen at a temperature of about 300° C. and a pressure of about 150 atmospheres over a contact mass containing copper and zinc in the approximate proportions of ten to one.

In testimony whereof they hereunto affix their signatures.

OTTO SCHMIDT.
JOHANNES UFER.